(12) United States Patent
Dugas

(10) Patent No.: US 7,773,340 B2
(45) Date of Patent: *Aug. 10, 2010

(54) PATTERNED MAGNETIC RECORDING HEAD HAVING A GAP PATTERN WITH SUBSTANTIALLY ELLIPTICAL OR SUBSTANTIALLY DIAMOND-SHAPED TERMINATION PATTERN

(75) Inventor: Matthew P. Dugas, St. Paul, MN (US)

(73) Assignee: Advanced Research Corporation, White Bear Lake, MN (US)

( * ) Notice: Subject to any disclaimer, the term of this patent is extended or adjusted under 35 U.S.C. 154(b) by 663 days.

This patent is subject to a terminal disclaimer.

(21) Appl. No.: 11/691,992

(22) Filed: Mar. 27, 2007

(65) Prior Publication Data

US 2007/0297089 A1    Dec. 27, 2007

Related U.S. Application Data

(63) Continuation-in-part of application No. 10/683,809, filed on Oct. 10, 2003, now Pat. No. 7,196,870, which is a continuation-in-part of application No. 09/922,546, filed on Aug. 3, 2001, now Pat. No. 6,678,116, which is a continuation of application No. 09/255,762, filed on Feb. 23, 1999, now Pat. No. 6,269,533.

(51) Int. Cl.
*G11B 5/187*    (2006.01)
*G11B 5/23*    (2006.01)
(52) U.S. Cl. ............... 360/122; 360/119.04; 360/119.12
(58) Field of Classification Search .......... 360/110–128
See application file for complete search history.

(56) References Cited

U.S. PATENT DOCUMENTS

| | | | |
|---|---|---|---|
| 3,699,334 | A | 10/1972 | Cohen et al. |
| 4,457,803 | A | 7/1984 | Takigawa |
| 4,535,376 | A | 8/1985 | Nomura et al. |
| 4,758,304 | A | 7/1988 | McNeil et al. |
| 5,016,342 | A | 5/1991 | Pisharody et al. |
| 5,035,787 | A | 7/1991 | Parker et al. |
| 5,067,230 | A | 11/1991 | Meunier et al. |
| 5,086,015 | A | 2/1992 | Itoh et al. |
| 5,093,980 | A | 3/1992 | Maurice et al. |

(Continued)

FOREIGN PATENT DOCUMENTS

EP    0 913 813 A2    10/1998

(Continued)

OTHER PUBLICATIONS

Hisatoshi, Hata, Patent Abstracts of Japan (Publication No. 06333210), Feb. 12, 1994.

(Continued)

*Primary Examiner*—A. J. Heinz
(74) *Attorney, Agent, or Firm*—Dorsey & Whtiney LLP; Nathan J. Witzany, Esq.

(57) ABSTRACT

A thin-film magnetic recording head utilizing a timing based servo pattern is fabricated by sputtering a magnetically permeable thin film onto a substrate. A gap pattern, preferably a timing based pattern, is defined by the thin film. The gap pattern includes termination patterns or endpoints that are elliptical or diamond-shaped.

19 Claims, 13 Drawing Sheets

U.S. PATENT DOCUMENTS

| | | | |
|---|---|---|---|
| 5,189,580 | A | 2/1993 | Pisharody et al. |
| 5,211,734 | A | 5/1993 | Yagami et al. |
| 5,301,418 | A | 4/1994 | Dirne et al. |
| 5,402,295 | A | 3/1995 | Suzuki et al. |
| 5,405,734 | A | 4/1995 | Aita |
| 5,452,166 | A | 9/1995 | Aylwin et al. |
| 5,567,333 | A | 10/1996 | Hira et al. |
| 5,572,392 | A | 11/1996 | Aboaf et al. |
| 5,639,509 | A | 6/1997 | Schemmel |
| 5,652,015 | A | 7/1997 | Aboaf et al. |
| 5,675,461 | A | 10/1997 | Aylwin et al. |
| 5,677,011 | A | 10/1997 | Hatakeyama et al. |
| 5,689,384 | A | 11/1997 | Albrecht et al. |
| 5,715,597 | A | 2/1998 | Aylwin et al. |
| 5,719,730 | A | 2/1998 | Chang et al. |
| 5,726,841 | A | 3/1998 | Tong et al. |
| 5,737,826 | A | 4/1998 | Slade et al. |
| 5,751,526 | A | 5/1998 | Schemmel |
| 5,752,309 | A | 5/1998 | Partee et al. |
| 5,822,159 | A | 10/1998 | Fukuyama et al. |
| 5,831,792 | A | 11/1998 | Ananth |
| 6,018,444 | A | 1/2000 | Beck et al. |
| 6,229,669 | B1 | 5/2001 | Beck et al. |
| 6,269,533 | B2 | 8/2001 | Dugas |
| 6,462,904 | B1 | 10/2002 | Albrecht et al. |
| 6,542,325 | B1 | 4/2003 | Molstad et al. |
| 6,950,277 | B1 | 9/2005 | Nguy et al. |
| 7,196,870 | B2 * | 3/2007 | Dugas ........................ 360/122 |
| 7,283,317 | B2 * | 10/2007 | Dugas et al. .................. 360/48 |
| 2001/0003862 | A1 | 6/2001 | Dugas |
| 2001/0045005 | A1 | 11/2001 | Dugas |
| 2003/0099057 | A1 | 5/2003 | Molstad |

FOREIGN PATENT DOCUMENTS

| | | |
|---|---|---|
| JP | 59-008833 | 1/1984 |
| JP | 60-07847 | 4/1985 |
| JP | 61-151667 | 6/1986 |
| JP | 61-291074 | 12/1986 |
| JP | 02097659 | 4/1990 |
| JP | 02288530 | 10/1990 |
| JP | 03324223 | 12/1991 |
| JP | 04091317 | 4/1992 |
| JP | 06035569 | 3/1994 |
| JP | 06242827 | 10/1994 |
| JP | 06333210 | 12/1994 |
| JP | 07187016 | 7/1995 |
| JP | A-11-242803 | 9/1999 |
| JP | A-2003-168203 | 6/2003 |
| WO | WO 97/40493 | 10/1997 |
| WO | WO 00/51109 | 8/2000 |
| WO | WO 2005/036534 | 4/2005 |

OTHER PUBLICATIONS

Albrecht, Thomas, et al. "Time-Based, Track-Following Servos for Linear tape Drives", *Data Storage*, Oct. 1997.

Monigle, William C. "FIBs Probe and Fix Semiconductor Problems", *Test & Measurement World*, May 1988.

McDermott, Michael, "Head Makers Discovery Focused Ion Beams", *Data Storage*, Mar. 1998.

R.C. Barrett, et al., "Timing-based Track-Following Servo for Linear Tape Systems", *IEEE Transactions on Magnetics*, vol. 34, No. 4, Jul. 1998, pp. 1872-1877.

* cited by examiner

US 7,773,340 B2

PATTERNED MAGNETIC RECORDING HEAD HAVING A GAP PATTERN WITH SUBSTANTIALLY ELLIPTICAL OR SUBSTANTIALLY DIAMOND-SHAPED TERMINATION PATTERN

CROSS-REFERENCE TO RELATED APPLICATION(S)

The present application is a continuation-in-part of U.S. patent application Ser. No. 10/683,809, entitled "Patterned Magnetic Recording Head with Termination Pattern Having a Curved Portion," filed on Oct. 10, 2003, now issued U.S. Pat. No. 7,196,870, which is a continuation-in-part of U.S. patent application Ser. No. 09/922,546, filed Aug. 3, 2001, now issued U.S. Pat. No. 6,678,116, which is a continuation of U.S. patent application Ser. No. 09/255,762, filed Feb. 23, 1999, now issued U.S. Pat. No. 6,269,533, each of which are hereby incorporated herein by reference.

FIELD OF THE INVENTION

This invention relates generally to magnetic recording heads and more particularly to a method of making thin-film magnetic heads for imprinting servo patterns on a magnetic media.

BACKGROUND OF THE INVENTION

While a variety of data storage mediums are available, magnetic tape remains a preferred forum for economically storing large amounts of data. In order to facilitate the efficient use of this media, magnetic tape will have a plurality of data tracks extending in a transducing direction of the tape. Once data is recorded onto the tape, one or more data read heads will read the data from those tracks as the tape advances, in the transducing direction, over the read head. It is generally not feasible to provide a separate read head for each data track, therefore, the read head(s) must move across the width of the tape (in a translating direction), and center themselves over individual data tracks. This translational movement must occur rapidly and accurately.

In order to facilitate the controlled movement of a read head across the width of the media, a servo control system is generally implemented. The servo control system consists of a dedicated servo track embedded in the magnetic media and a corresponding servo read head which correlates the movement of the data read heads.

The servo track contains data, which when read by the servo read head is indicative of the relative position of the servo read head with respect to the magnetic media in a translating direction. In one type of traditional arrangement, the servo track was divided in half. Data was recorded in each half track, at different frequencies. The servo read head was approximately as wide as the width of a single half track. Therefore, the servo read head could determine its relative position by moving in a translating direction across the two half tracks. The relative strength of a particular frequency of data would indicate how much of the servo read head was located within that particular half track.

While the half track servo system is operable, it is better suited to magnetic media where there is no contact between the storage medium and the read head. In the case of magnetic tape, the tape actually contacts the head as it moves in a transducing direction. Both the tape and the head will deteriorate as a result of this frictional engagement; thus producing a relatively dirty environment. As such, debris will tend to accumulate on the read head which in turn causes the head to wear even more rapidly. Both the presence of debris and the wearing of the head have a tendency to reduce the efficiency and accuracy of the half track servo system.

Recently, a new type of servo control system was created which allows for a more reliable positional determination by reducing the signal error traditionally generated by debris accumulation and head wear. U.S. Pat. No. 5,689,384, issued to Albrect et al. on Nov. 19, 1997, introduces the concept of a timing-based servo pattern, and is herein incorporated by reference in its entirety.

In a timing-based servo pattern, magnetic marks (transitions) are recorded in pairs within the servo track. Each mark of the pair will be angularly offset from the other. Virtually any pattern, other than parallel marks, could be used. For example, a diamond pattern has been suggested and employed with great success. The diamond will extend across the servo track in the translating direction. As the tape advances, the servo read head will detect a signal or pulse generated by the first edge of the first mark. Then, as the head passes over the second edge of the first mark, a signal of opposite polarity will be generated. Now, as the tape progresses no signal is generated until the first edge of the second mark is reached. Once again, as the head passes the second edge of the second mark, a pulse of opposite polarity will be generated. This pattern is repeated indefinitely along the length of the servo track. Therefore, after the head has passed the second edge of the second mark, it will eventually arrive at another pair of marks. At this point, the time it took to move from the first mark to the second mark is recorded. Additionally, the time it took to move from the first mark (of the first pair) to the first mark of the second pair is similarly recorded.

By comparing these two time components, a ratio is determined. This ratio will be indicative of the position of the read head within the servo track, in the translating direction. As the read head moves in the translating direction, this ratio will vary continuously because of the angular offset of the marks. It should be noted that the servo read head is relatively small compared to the width of the servo track. Because position is determined by analyzing a ratio of two time/distance measurements, taken relatively close together, the system is able to provide accurate positional data, independent of the speed (or variance in speed) of the media.

By providing more than one pair of marks in each grouping, the system can further reduce the chance of error. As the servo read head scans the grouping, a known number of marks should be encountered. If that number is not detected, the system knows an error has occurred and various corrective measures may be employed. Once the position of the servo read head is accurately determined, the position of the various data read heads can be controlled and adjusted with a similar degree of accuracy.

When producing magnetic tape (or any other magnetic media) the servo track is generally written by the manufacturer. This results in a more consistent and continuous servo track, over time. To write the timing-based servo track described above, a magnetic recording head bearing the particular angular pattern as its gap structure, must be utilized. As it is advantageous to minimize the amount of tape that is dedicated to servo tracks, to allow for increased data storage, and it is necessary to write a very accurate pattern, a very small and very precise servo recording head must be fabricated.

Historically, servo recording heads having a timing-based pattern have been created utilizing known plating and photolithographic techniques. A head substrate is created to form the base of the recording head. Then, a pattern of photoresist is deposited onto that substrate. The photoresist pattern essentially forms the gap in the head. Therefore, the pattern will replicate the eventual timing-based pattern. After the pattern has been applied a magnetically permeable material such as NiFe is plated around the photoresist pattern. Once so formed, the photoresist is washed away leaving a head having a thin film magnetic substrate with a predefined recording gap.

Alternatively, broad beam ion milling is used to form a first layer having a relatively large gap. A pattern of photoresist is applied in an inverse of the above described pattern. That is, photoresist is applied everywhere except where the timing based pattern (gap) is to be formed. Ion milling is used to cut the gap through the first layer. Then an additional layer of the magnetically permeable material is deposited by plating over the first layer and a narrow gap is formed into this layer by the above described photolithographic process. This approach produces a more complicated head with a horizontally-processed or pancake-style thin film coil. The broad beam ion milling of the write pole does not produce an optimal gap structure.

While the above techniques are useful in producing timing-based recording heads, they also limit the design characteristics of the final product. In the first method, only materials which may be plated can be utilized, such as NiFe (Permalloy). Generally, these materials do not produce heads that have a high wear tolerance. As such, these heads will tend to wear out in a relatively short time. In addition, this class of materials have a low magnetic moment density (10 kGauss for NiFe), or saturation flux density, which limits their ability to record on very high coercivity media.

The second method also relies on plating for the top magnetic layer and is therefore limited to the same class of materials. In addition, the use of broad beam ion milling makes the fabrication of such a head overly complex. The photoresist pattern can be applied relatively precisely, thereby forming a channel over the gap. However, the traditional ion milling technique is rather imprecise and as the ions pass through that channel they are continuously being deflected. Conceptually, in any recording gap, so cut, the relative aspect ratios involved prevent a precise gap from being defined. In other words, this is a shadowing effect created by the photoresist and causes the gap in the magnetically permeable material to be angled. Generally, the sidewalls of the gap will range between 45°-60° from horizontal. This introduces a variance into the magnetic flux as it exits the gap, resulting in a less precise timing based pattern being recorded onto the servo track.

Therefore, there exists a need to provide a magnetic recording head capable of producing a precise timing-based pattern. Furthermore, it would be advantageous to produce such a head having a tape bearing surface which is magnetically efficient as well as wear resistant and hence a choice of sputtered rather than plated materials are required. Thus, it is proposed to use a fully dry process to fabricate a time-based head using predominantly iron nitride based alloys.

BRIEF SUMMARY OF THE INVENTION

The present invention, in one embodiment, is a magnetic recording head for generating servo tracks on a magnetic medium. The magnetic recording head includes a substrate having a generally planar first surface and a magnetically-permeable thin film deposited onto the first surface. A gap pattern is defined by the thin film, and the gap has corresponding termination patterns having at least one curved portion.

The present invention, according to another embodiment, is a gap pattern for a magnetic recording head. The gap pattern includes a pair of non-parallel, longitudinally extending gaps having a width and terminating in at least one termination pattern, wherein the termination pattern has at least one curved portion.

DETAILED DESCRIPTION

Figure 1:
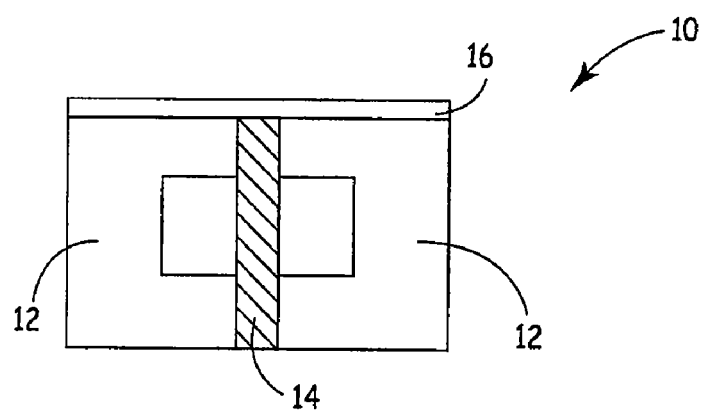
FIG. 1 is a side planar view of a substrate bearing a magnetic thin film.

The present invention is a method of making a thin film magnetic recording head using a focused ion beam ("FIB") to mill out gaps in the tape bearing surface. Referring to FIG. 1, a substrate 10 is created by glass bonding two C-shaped ferrite blocks 12 to a medially disposed ceramic member 14. The sizes and relative proportions of the ferrite blocks 12 and ceramic member 14 may vary as dictated by the desired parameters of the completed recording head. Furthermore, the choice of materials may also vary so long as blocks 12 remain magnetic while member 14 remains magnetically impermeable.

A layer of magnetically permeable material is deposited as a thin film 16 across an upper surface of each of the ferrite blocks 12, as well as the upper surface of the ceramic member 14. The magnetically permeable thin film 16 will become the tape bearing and data writing surface for the magnetic head 5 (see FIGS. 12 & 13). As such, it is desirable to form the layer of thin film 16 from a material which has a relatively high magnetic moment density (greater or equal to about 15 kGauss) and is also wear resistant. An exemplary material for this purpose is FeN or alternatively Sendust™. For example, FeN has a magnetic moment density on the order of 19 to 20 kGauss and is resistant to the frictional deterioration caused by continuous tape engagement. Any of the alloys in the iron nitride family, such as iron aluminum nitride, iron tantalum nitride, etc., and including any number of elements, are also ideally suited. FeXN denotes the members of this family, wherein X is a single element or a combination of elements, as is known in the art.

FeXN is created by sputtering a FeX alloy (or simply Fe) in a nitrogen rich environment. It is not available in quantities sufficient for plating. Furthermore, even if so available, the FeXN would decompose during the electrolytic plating process. This is in stark contrast to the simple alloys which may be readily utilized in electrolytic plating techniques. Therefore, while it is advantageous to use alloys, such as FeXN, magnetic recording heads cannot be formed with them, in any previously known plating process. In addition, the most desirable alloys to use are often composed of three of more elements. Plating is generally limited to the so called binary alloys, and as explained above is not conducive to binary gaseous alloys, such as FeN. The use of sputtering in combination with the use of a FIB, not only allows any of these materials to be used but also produces a better wearing magnetic thin film with a higher saturation flux density and of sufficient permeability for use as a servo write head.

Referring again to FIG. 1, the thin film 16 is sputtered onto the surface of the ferrite blocks 12 and the ceramic member 14. Prior to the sputtering process, the surface is polished and prepared in a manner known to those skilled in the art. If desired, the surface may be ground to produce a slight curvature. This curvature will facilitate smooth contact between the tape and the completed head 5 as the tape moves across the tape bearing surface.

The thickness of the deposited thin film 16 determines the efficiency of the magnetic head and also its predicted wear life. The thicker the tape bearing surface (thin film 16) is, the longer the head will last. Conversely, the thicker the magnetic film, the longer it will take to process or etch with a FIB and it will also process less precisely. Therefore, the thin film should be deposited in a thickness of about 1 to 5 mm. Ideally, the thickness will be about 2 to 3 mm.

Figure 2:
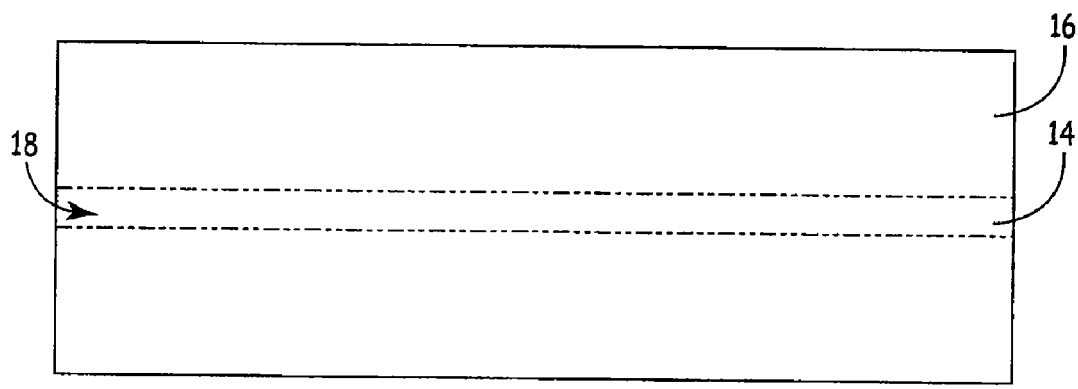
FIG. 2 is a top planar view of the substrate shown in FIG. 1.

FIG. 2 is a top view of the substrate 10 and in particular the major surface of magnetic thin film 16 with the underlying ceramic member 14 shown in dashed lines. The area 18 is defined by the upper surface of the ceramic member 14 (the magnetic sub-gap) and is where the appropriate gaps will eventually be milled.

Figure 3:
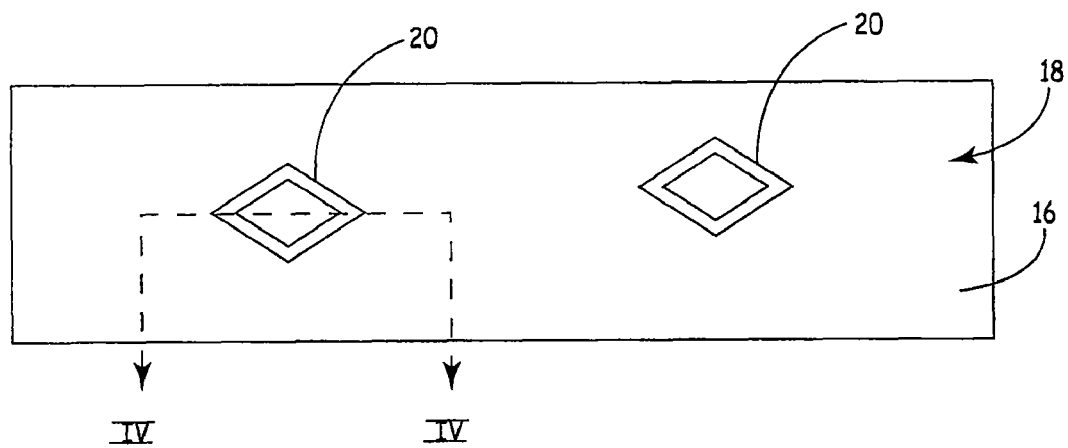
FIG. 3 is top planar view of a portion of thin film, bearing indicia of a gap to be milled.

Referring to FIG. 3, only area 18 is shown. Within area 18, some indicia 20 of the eventual gap positions are laid down. It should be noted that two diamond shaped gaps are to be milled as shown in FIG. 3; however any shape and any number of gaps could be created. Indicia 20 is simply an indication of where the FIB is to mill. One way of accomplishing this is to place a layer of photoresist 22 down and define the indicia 20 with a mask. Using the known techniques of photolithography, a layer of photoresist 22 will remain in all of area 18 except in the thin diamond defined by indicia 20. Alternatively, the photoresist area could be substantially smaller than area 18, so long as it is sufficient to define indicia 20. The photoresist differs in color and height from the thin film 16 and therefore produces the visually discernible pattern. This pattern is then registered with the FIB control system through a graphical interface; thus delineating where the FIB is to mill. The photoresist serves no other purpose, in this process, than to visually identify a pattern. As such, many alternatives are available. Any high resolution printing technique capable of marking (without abrading) the surface of the thin film 16 could be used. Alternatively, the pattern could be created completely within the FIB control system. That is, numerical coordinates controlling the path of the FIB and representing the pattern could be entered; thus, obviating the need for any visual indicia to be placed onto the magnetic thin film 16. Finally, a visual pattern could be superimposed optically onto the FIB graphical image of the substrate 10, thereby producing a visually definable region to mill without actually imprinting any indicia onto the substrate 10.

In any of the above described ways, the FIB 24 is programmed to trace a predefined pattern, such as the diamond indicia 20 shown in FIG. 3. The FIB will be orientated in a plane orthogonal to the major surface of the thin film 16.

Figure 4:
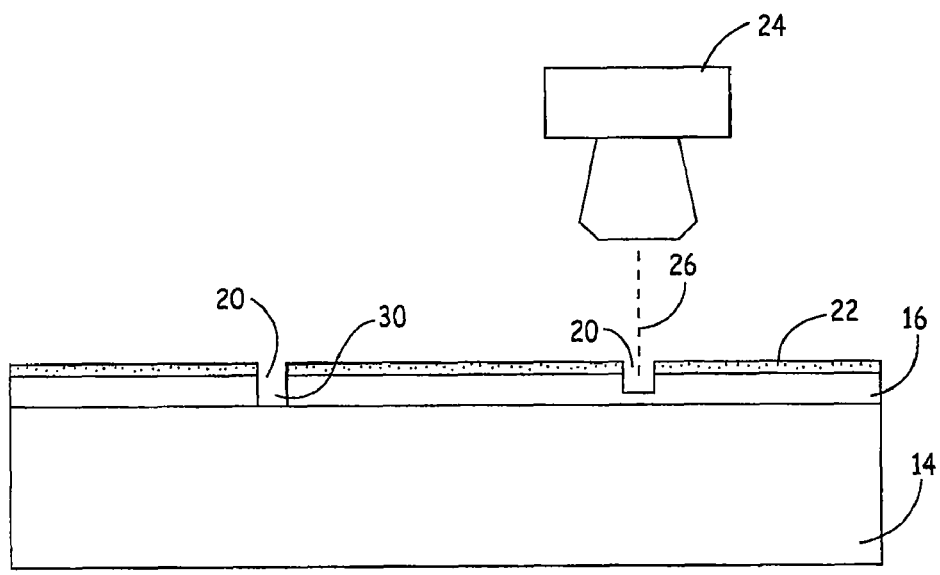
FIG. 4 is a schematic diagram of a FIB milling a gap into a thin film.

FIG. 4 is a sectional view of FIG. 3, taken about line IV-IV and illustrates the milling process utilizing FIB 24. The upper surface of the thin film 16 has been coated with a thin layer of photoresist 22. The visual indicia 20 of the diamond pattern is present, due to the area of that indicia 20 being void of photoresist. The FIB 24 has already milled a portion of the pattern forming gap 30. The FIB as shown has just begun to mill the right half of the pattern. The beam of ions 26 is precisely controlled by the predefined pattern which has been entered into the FIB's control system. As such, the beam 26 will raster back and forth within the area indicated by indicia 20. The beam 26 will generally not contact a significant amount of the photoresist 22 and will create a gap 30 having vertical or nearly vertical side walls. The width of the ion beam is controllable and could be set to leave a predefined amount of space between the edge of the side wall and the edge of the indicia 20. The FIB 24 will raster back and forth until all of the indicia 20 have been milled for that particular head.

Figure 5:
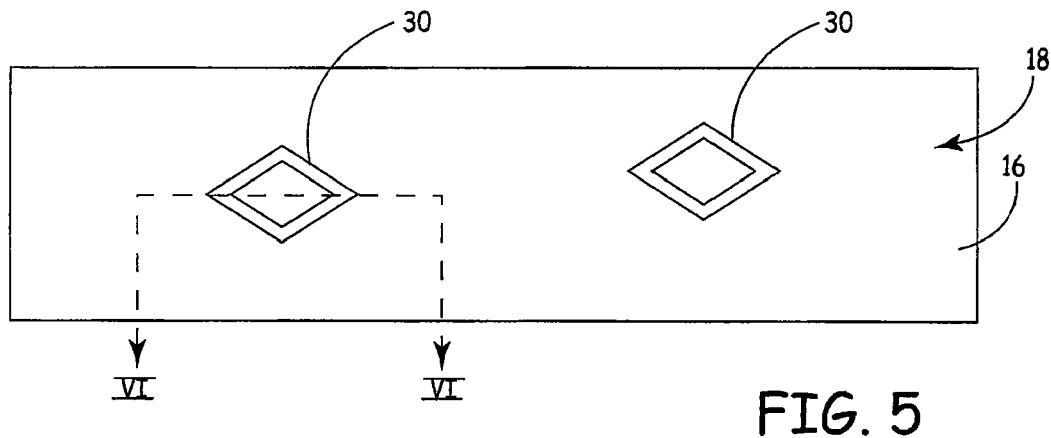
FIG. 5 is a top planar view of a thin film having gaps milled by a FIB.
Figure 6:
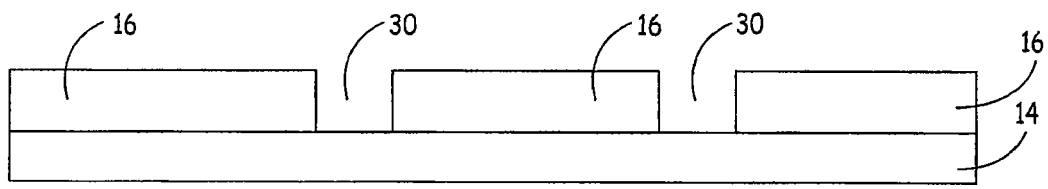
FIG. 6 is a side sectional view taken about line VI-VI.

After the FIB 24 has milled all of the gap(s) 30, the photoresist 22 is washed away. Alternatively, any other indicia used would likewise be removed. FIG. 5 illustrates area 18 of substrate 10 after the photo resist 22 has been removed. Thin film 16 is exposed and has precisely defined gaps 30 milled through its entire depth, down to the ceramic member 14. FIG. 6 is a sectional view of FIG. 5 taken about line VI-VI of FIG. 5 and illustrates the milled surface of gap 30. The gap 30 is precisely defined, having vertical or nearly vertical walls.

Figure 14:
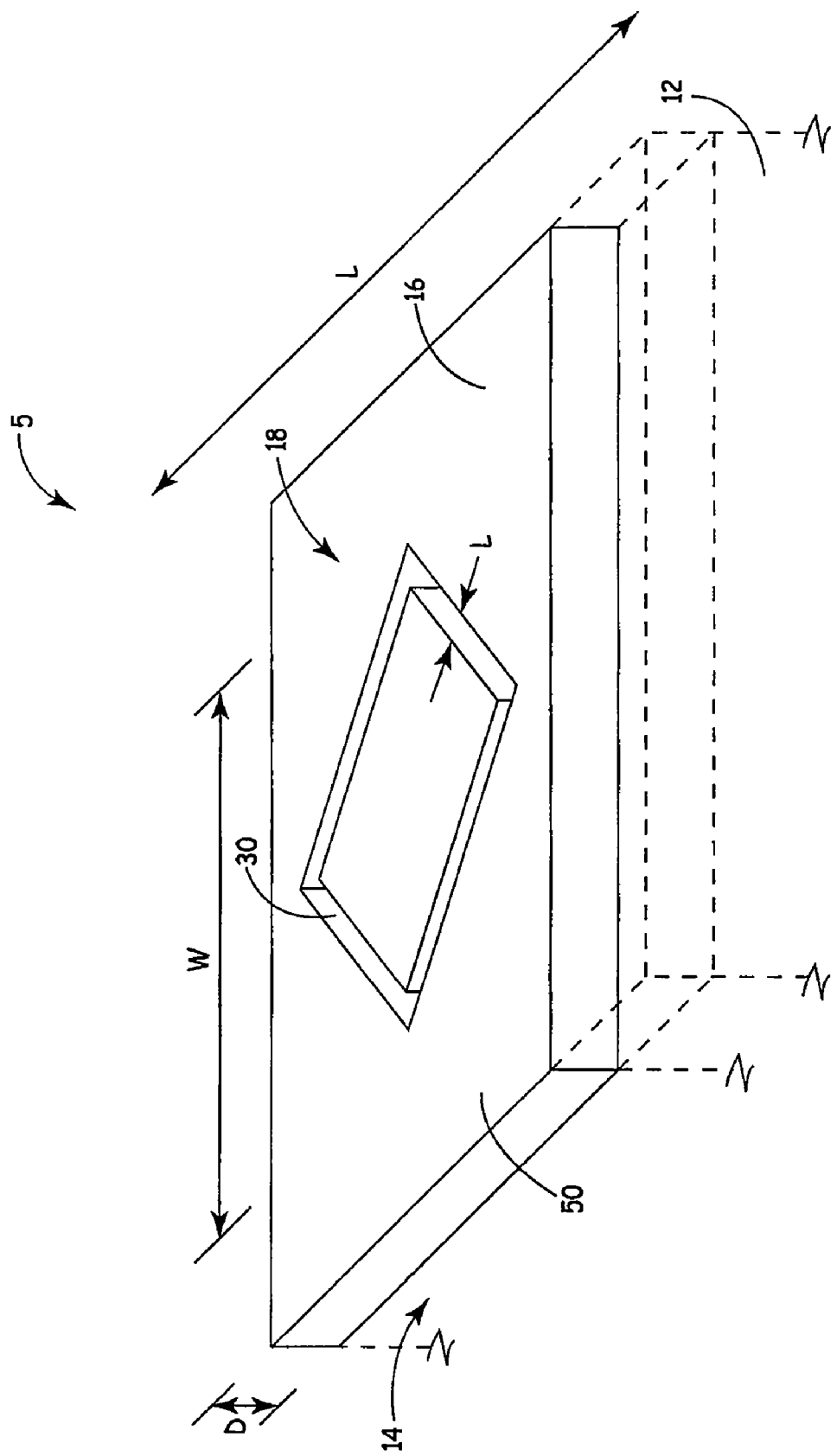
FIG. 14 is a partial perspective view of thin film layer bearing a set of time based or angled recording gap pairs.

Referring to FIG. 14, a partial perspective view of a time based recording head 5 is shown. The major surface 50 of thin film 16 lies in a plane defined by width W, length L, and depth D. D is the deposited thickness of the magnetic film 16. The FIB will always mill through thin film 16 through a plane substantially perpendicular to the major surface 50 which would also be parallel to depth D. By conventional standards, the gap 30 will have a magnetic gap depth equal to depth D, the thickness of the deposited film, and a gap width equal to width W and a gap length (L') equal to the span of gap 30 in the direction shown.

Figure 7:
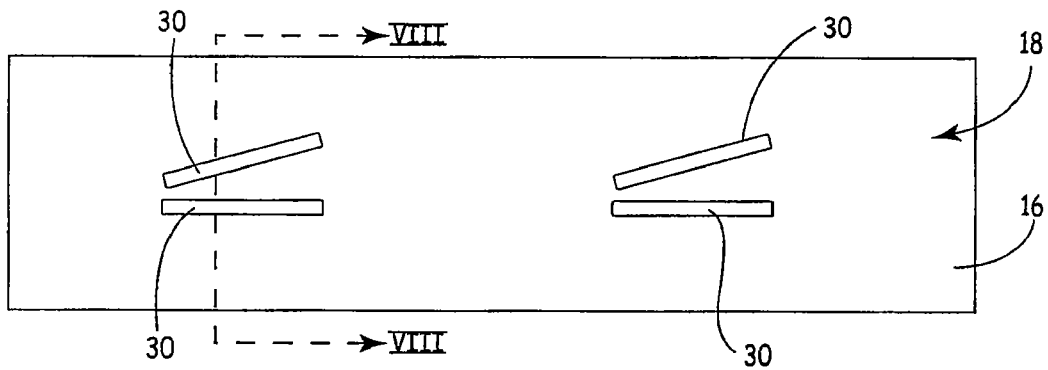
FIG. 7 is a top planar view of a thin film having gaps milled by a FIB.
Figure 8:
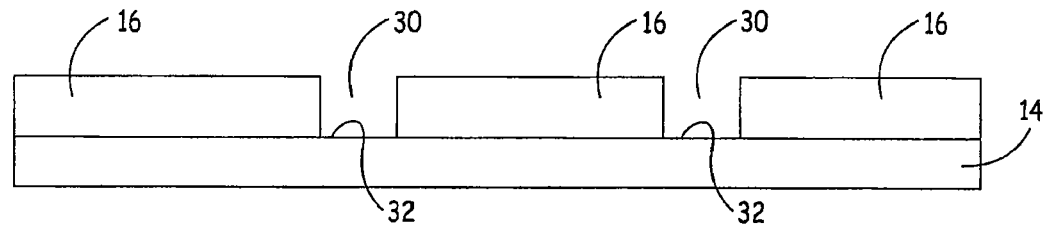
FIG. 8 is side sectional view taken about line VII-VII.

The upper surface of thin film 16, shown in FIG. 7, represents one of many alternative time based patterns which may be created using a FIB 24. Here, gaps 30 will be milled in exactly the same fashion as described above, except that indicia 20, when utilized, would have formed the pattern shown in FIG. 7. FIG. 8 is a sectional view taken about line VII-VII of FIG. 7 and shows how gap 30 continues to have precisely defined practically vertical sidewalls. Furthermore, the upper horizontal surface 32 of ceramic member 14 is also precisely defined.

Figure 9A:
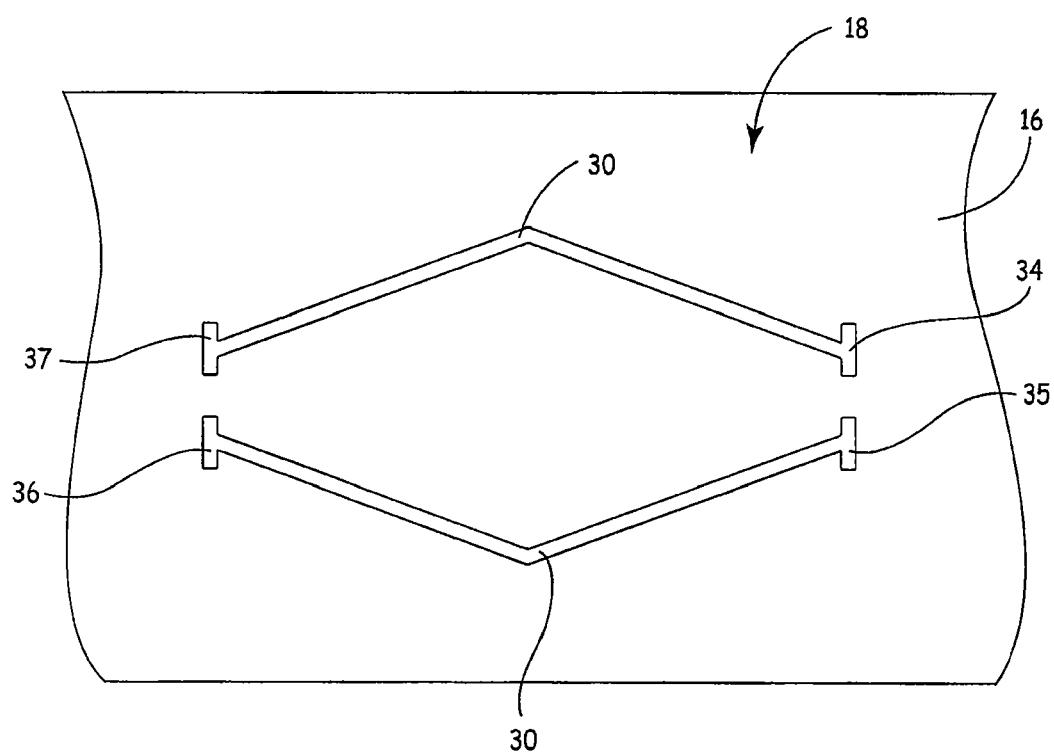
FIG. 9A is a top planar view of a portion of thin film having a gap and endpoints milled by a FIB.

FIG. 9A illustrates yet another pattern which may be defined using FIB 24. Here, gap 30 is in the shape of an augmented diamond. Rather than defining a diamond having connected corners, gap 30 is milled to have termination patterns or endpoints 34, 35, 36 and 37. Creating endpoints 34, 35, 36 and 37 increases the definition of the finished recorded pattern near the ends of the track by helping to maintain nearly the full magnetic field to the end of the pattern. Several different shapes are possible for the termination patterns or endpoints 34, 35, 36, and 37. The rectangular shape shown in 9A, in some situations, may result in writing of the magnetic media slightly outside of the gap pattern. Specifically, in these instances, the sharp corners may cause a high concentration of magnetic flux that causes writing of the magnetic media. The termination patterns or endpoints 34, 35, 36, 37 are formed using any technique known in the art.

Figure 9B:
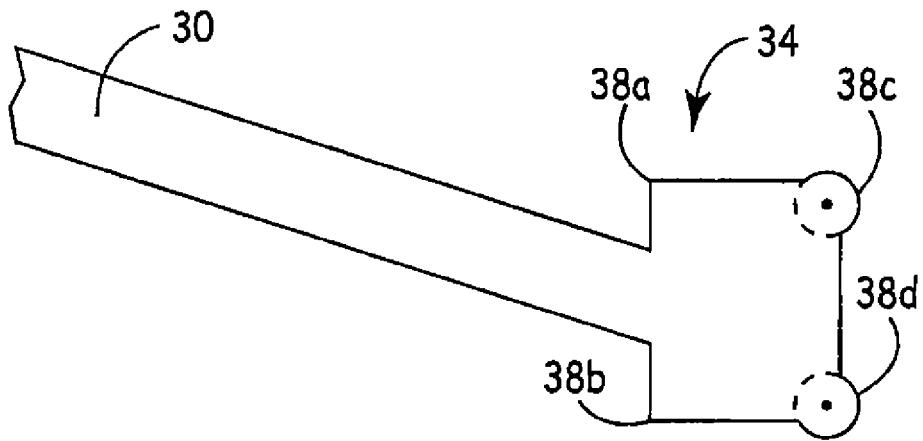
FIGS. 9B-9E show various configurations for the termination patterns or endpoints shown in FIG. 9A.

FIGS. 9B-9E show various configurations for the termination pattern or endpoint 34. The configuration shown in FIGS. 9B-9E may also be applied to one or more of the other termination patterns or endpoints 35, 36, and 37. The configurations shown in FIGS. 9B-9E include rounded corners to prevent build-up of magnetic flux, which in turn prevents writing outside of the gap pattern. The termination patterns may be any suitable shape having at least one curved portion. The termination patterns may be used to terminate a gap pattern formed using any technique known in the art. As shown in FIG. 9B, the endpoint 34 is generally square-shaped and includes two inside corners 38a and 38b and two outside corners 38c and 38d. In the embodiment shown, the outside corners 38c, 38d are rounded by replacing the square corner with an arc. As shown in FIG. 9B, the arc is a partial circle (the remainder of which is shown by the dashed line) having a center set slightly in from the point of intersection of the two sides of the endpoint 34. In another embodiment, the insider corners 38a, 38b are also rounded in the same manner as the outside corners 38c, 38d. In one embodiment, the endpoint 34 is generally rectangular-shaped. In one embodiment, the rounded corners are formed from a circle having a diameter of between about 10% and about 50% of the length of the side of the endpoint 34. In another embodiment, the rounded corners are formed from a circle having a diameter of about 30% of the length of the side of the endpoint 34. In one embodiment, for example, the sides of the termination box or endpoint 34 are about 6.5 microns and the diameter of the circle used to round the corners is about 2 microns. In the embodiment wherein the outside corners 38c, 38d are rounded, the centers of the circles may be set about 5 microns apart.

Figure 9C:
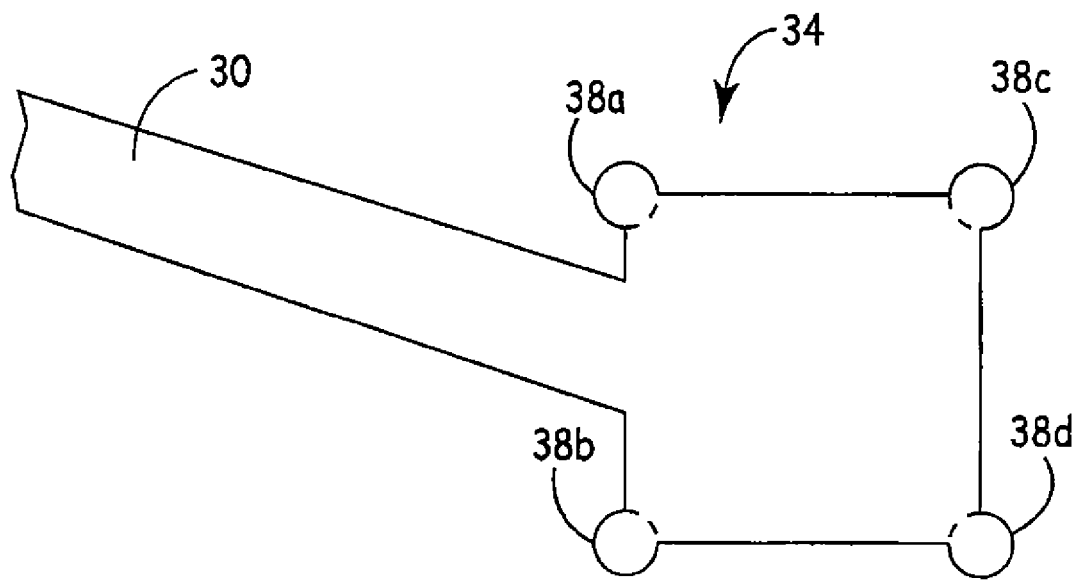
Figure 9D:
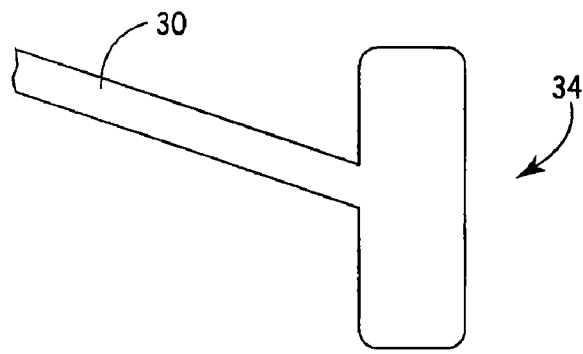

FIG. 9C shown another configuration for the endpoint 34. As shown in FIG. 9C, all four corners 38a, 38b, 38c, 38d are rounded in the shape of three-quarters of a circle. In this embodiment, the corners are rounded to correspond to a circle centered on or about the point of intersection of the sides of the endpoint 34. In another embodiment, only the outside corners 38c, 38d are rounded as shown. In one embodiment, the endpoint 34 is generally rectangular-shaped. FIG. 9D shows another configuration of the endpoint 34 in which the corners are simply rounded using an arc corresponding to a quarter circle. Again, any of all of the corners 38a, 38b, 38c, 38d may be rounded. The diameter of the circle corresponding to the rounded corners shown in FIGS. 9C and 9D may vary. In one embodiment, the circle has a diameter of between about 10% and about 50% of the length of the side of the endpoint 34. In another embodiment, the circle has a diameter of about 30% of the length of the side of the endpoint 34.

Figure 9E:
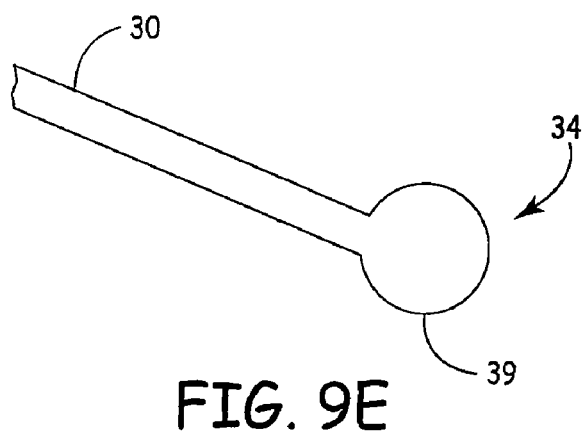
Figure 9F:
FIG. 9F shows an effect of a termination pattern configured to include a rounded pattern.
Figure 9F:
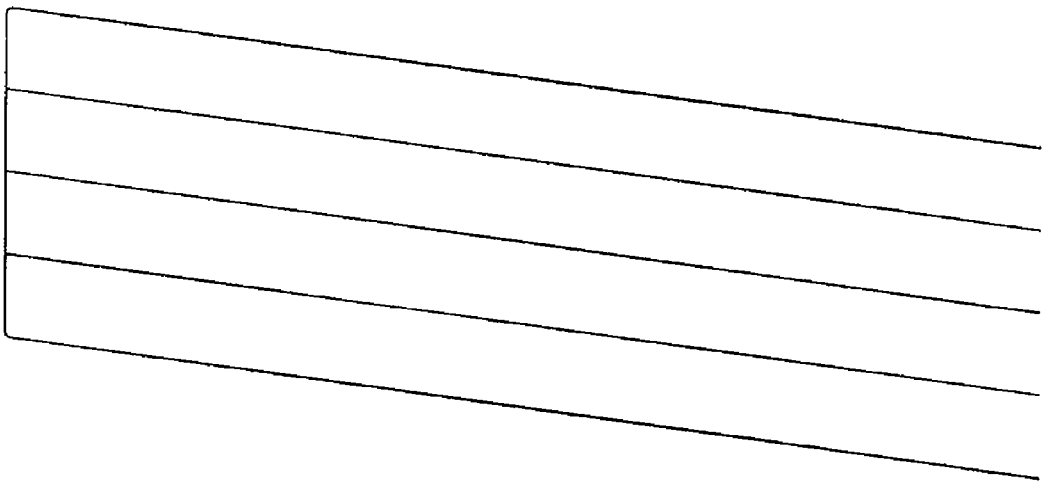
Figure 9G:
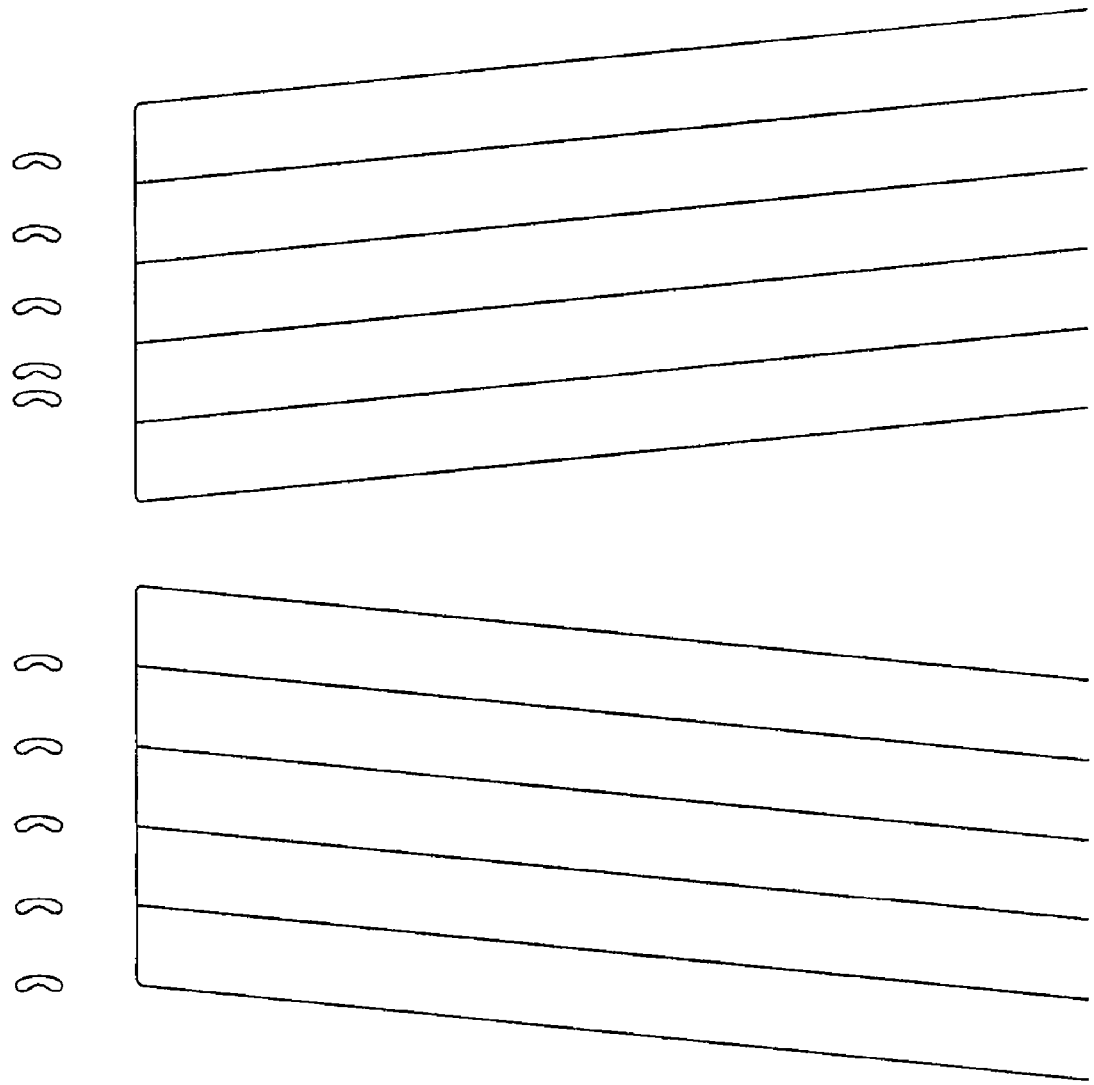
FIG. 9G shows an effect of a termination pattern configured with only sharp corners.

FIG. 9E shows yet another configuration of the termination pattern or endpoint 34. The endpoint 34 may be defined by any curved surface 39. As shown in FIG. 9E, the endpoint 34 is a circle. The circle may have any diameter greater than the perpendicular distance between the walls of the gap 30. In one embodiment, the diameter of the circle is from between about 1.1 to about 4 times greater than the perpendicular distance between opposing walls of the gap 30. In another embodiment, the diameter of the circle is about 2 times greater than the perpendicular distance between opposing walls of the gap 30. In one embodiment, the circle has a diameter of from about 5 to about 7 microns. This diameter range of 5 to 7 microns approximates the effect of the similarly sized termination pattern configured as a rectangular box (as shown in FIG. 9A) in terms of keeping the magnetic flux from leaking around the track edges. However, the a termination pattern using sharp corners does not prevent leakage as well as a termination patter using the rounded corners. This effect is shown in FIG. 9F which shows the effect of a termination pattern with rounded corners and FIG. 9G, which has termination corners with sharp edges.

Figure 9H:
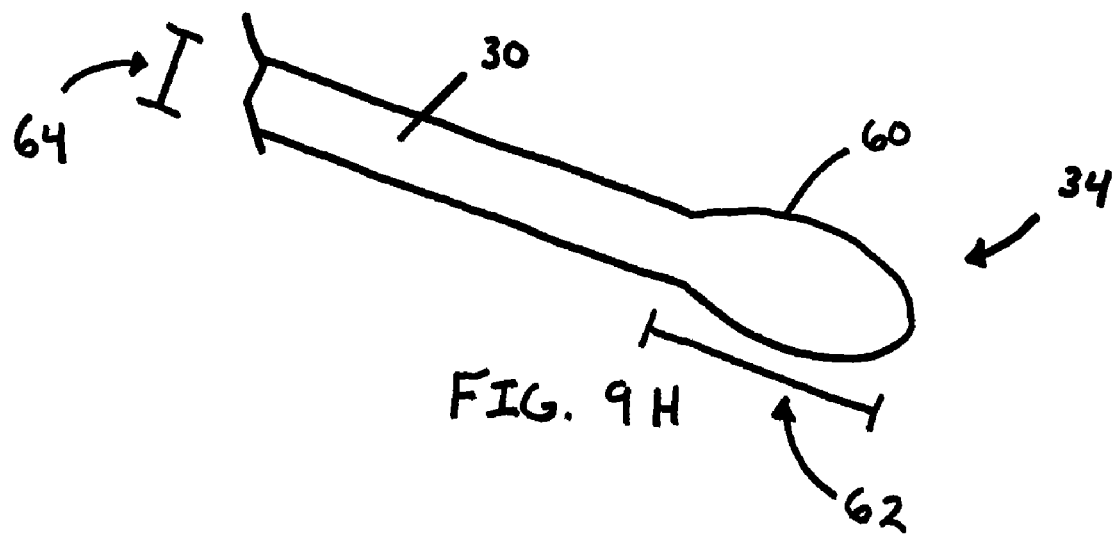
FIGS. 9H-9K show further various configurations for the termination patterns or endpoints shown in FIG. 9A.
Figure 9I:
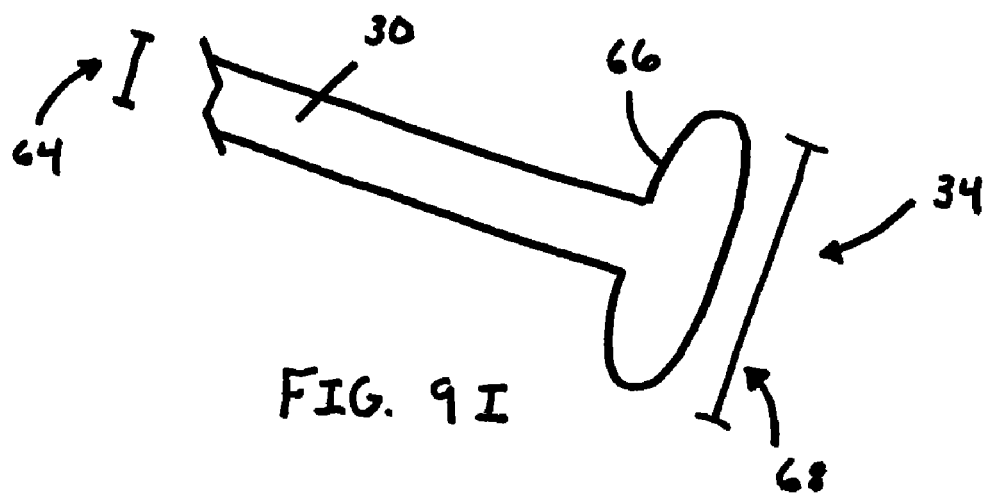
Figure 9J:
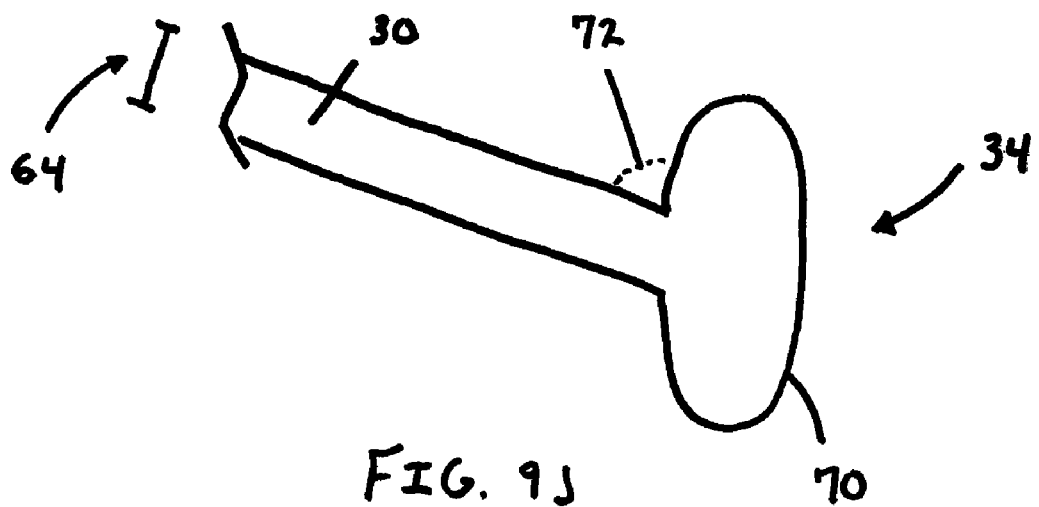

FIGS. 9H, 9I, and 9J show yet further configurations of the termination pattern or endpoint 34. The endpoint 34 may be defined by a curved surface forming substantially an ellipse. That is, the termination pattern or endpoint 34 may be elliptical-shaped. In one embodiment, as illustrated in FIG. 9H, the elliptical-shaped endpoint 60 may have a length 62 substantially perpendicular to the width 64 of the gap 30. In an alternative embodiment, as illustrated in FIG. 9I, the elliptical-shaped endpoint 66 may have a length 68 substantially parallel to the width 64 of the gap 30. In yet other embodiments, as shown in FIG. 9J for example, the elliptical-shaped endpoint 70 may be configured at any angle 72 to the width 64 of the gap 30.

Figure 9K:
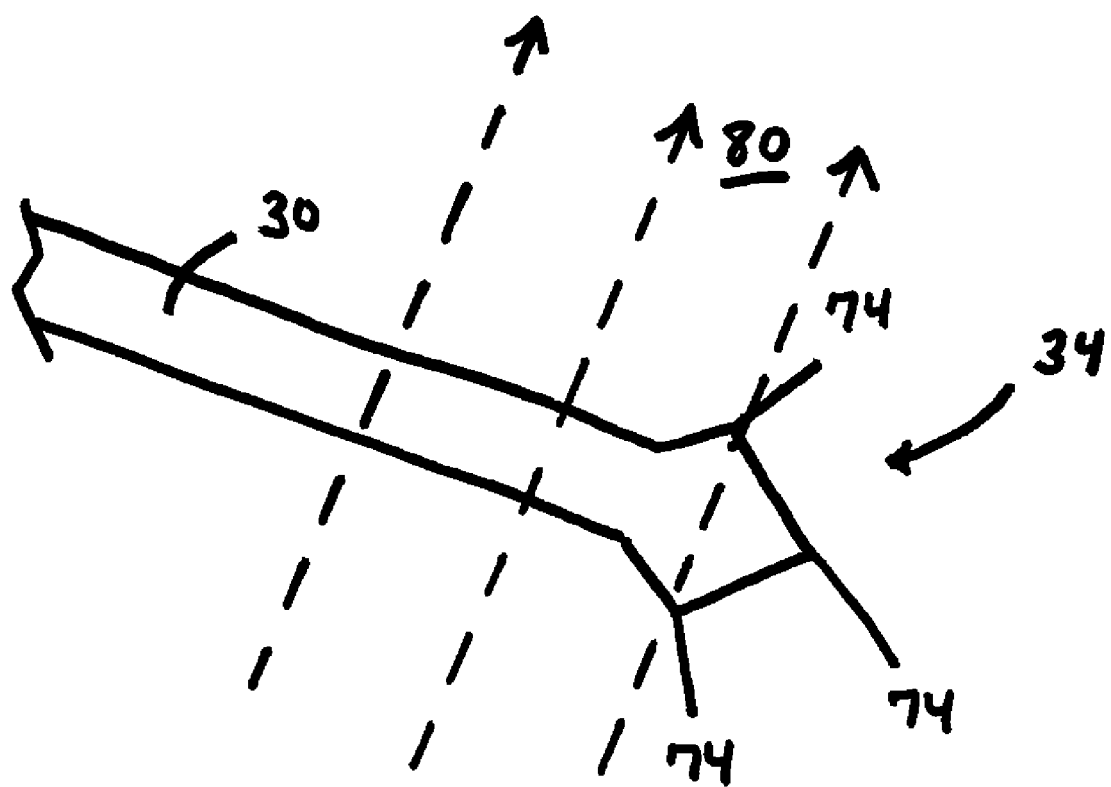

FIG. 9K shows another configuration of the termination pattern or endpoint 34. In one embodiment, the endpoint 34 may be generally diamond-shaped. In other embodiments, the termination pattern or endpoint 34 may be generally in the shape of a rectangle, square, other parallelogram, or polygon. In yet further embodiments, the termination pattern or endpoint 34 may be any polygon oriented at an angle such that the features of the polygon do not produce a magnetic field high enough to record transitions. In one embodiment, the edges of the diamond-shaped, or other polygon-shaped, endpoint are at, or near, a forty-five degree (45°) angle relative to the magnetic flux, generally illustrated as 80. In other embodiments, the edges of the diamond-shaped, or other polygon-shaped, endpoint are at any other suitable angle relative to the magnetic flux of the gap 30. In further embodiments, one or more of the outside corners 74 may be rounded, as previously discussed. In one embodiment, the rounded corners are formed from a circle having a diameter of between about 10% and about 50% of the length of a side of the endpoint 34. In another embodiment, the rounded corners are formed from a circle having a diameter of about 30% of the length of a side of the endpoint 34.

Figure 10:
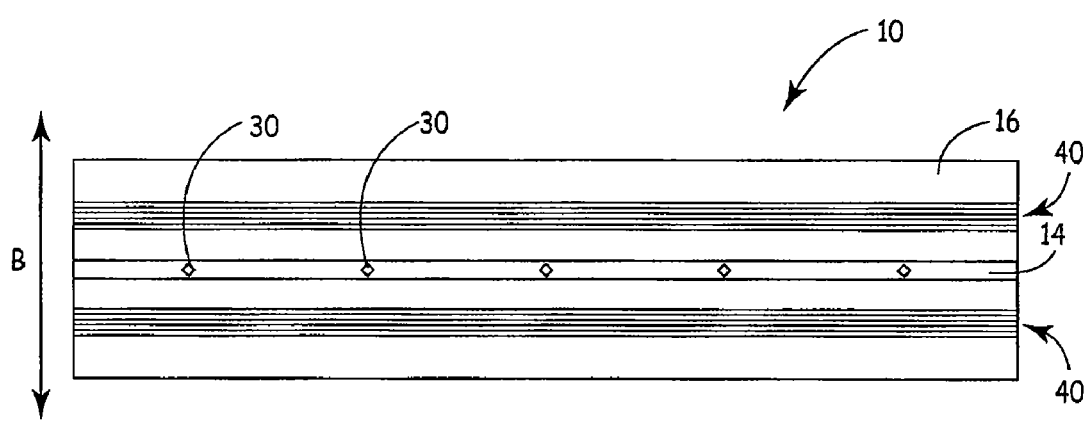
FIG. 10 is a top planar view of a substrate bearing gaps and air bleed slots.

The next step in the fabrication process is to create air bleed slots 40 in the tape bearing surface of the substrate 10, as shown in FIG. 10. Once substrate 10 has been fabricated into a recording head, magnetic tape will move across its upper surface in a transducing direction, as shown by Arrow B. Therefore, the air bleed slots 40 are cut perpendicular to the transducing direction. As the tape moves over the recording head at relatively high speed, air entrainment occurs. That is, air is trapped between the lower surface of the tape and the upper surface of the recording head. This results from the magnetic tape, comprised of magnetic particles affixed to a substrate, being substantially non-planar on a microscopic level. As the tape moves over the recording head, the first air bleed slot encountered serves to skive off the trapped air. The second and subsequent slots continue this effect, thus serving to allow the tape to closely contact the recording head. As the tape passes over the recording gap(s) 30, it is also held in place by the other negative pressure slot 42, 43 encountered on the opposite side of the gap(s) 30. Therefore, there is a negative pressure slot 42, 43 located on each side of the recording gap(s) 30.

Figure 11:
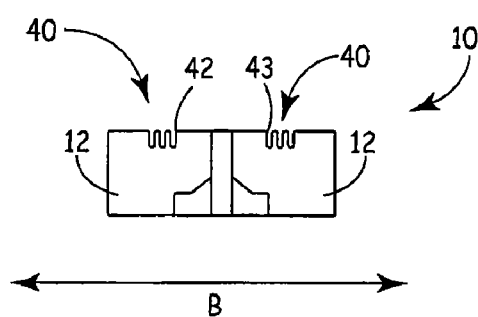
FIG. 11 is an end planar view of a substrate bearing air bleed slots.

FIG. 11 is a side view of the substrate 10, as shown in FIG. 10. The upper surface of the substrate 10 has a slight curvature or contour. This acts in concert with the air bleed slots to help maintain contact with the magnetic tape. The air bleed slots 40 are cut into the substrate 10 with a precise circular saw, as is known by those skilled in the art. The air bleed slots 40 are cut through thin film 16, which is present but not visible in FIG. 11. Alternatively, the air bleed slots 40 could be cut prior to the thin film 16 having been deposited.

Figure 13:
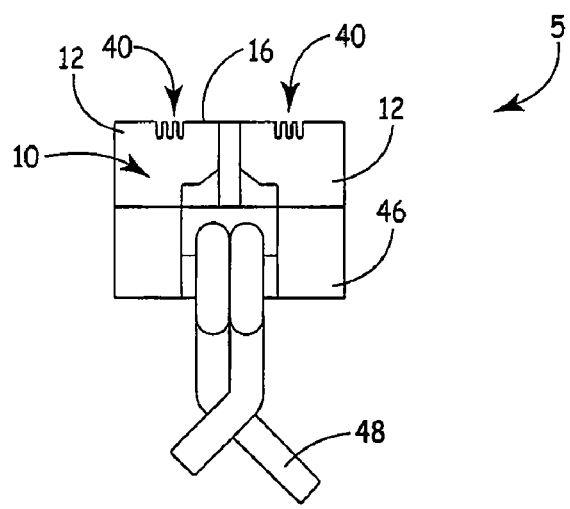
FIG. 13 is an end planar view of a magnetic recording head.

Substrate 10 has been longitudinally cut, thus removing a substantial portion of the coupled C-shaped ferrite blocks 12 and ceramic member 14. This is an optional step which results in an easier integration of the coils and ferrite blocks. FIG. 13 illustrates how a backing block 46 is bonded to substrate 10. The backing block 46 is composed of ferrite or another suitable magnetic material. Wiring is wrapped about the backing block 46 thus forming an electrical coil 48. With this step, the fabrication process has been completed and a magnetic recording head 5 has been produced.

In operation, magnetic recording head 5 is secured to an appropriate head mount. Magnetic tape is caused to move over and in contact with the tape bearing surface of the head 5, which happens to be the thin film layer 16. At the appropriate periodic interval, electrical current is caused to flow through the coil 48. As a result, magnetic flux is caused to flow (clockwise or counterclockwise in FIG. 13) through the back block 46, through the ferrite blocks 12, and through the magnetic thin film 16 (as the ceramic member 14 minimizes a direct flow from one ferrite block 12 to the other causing the magnetic flux to shunt through the permeable magnetic film). As the magnetic flux travels through the magnetic thin film 16, it leaks out through the patterned gaps 30, thus causing magnetic transitions to occur on the surface of the magnetic tape, in the same pattern and configuration as the gap 30 itself.

Figure 12:
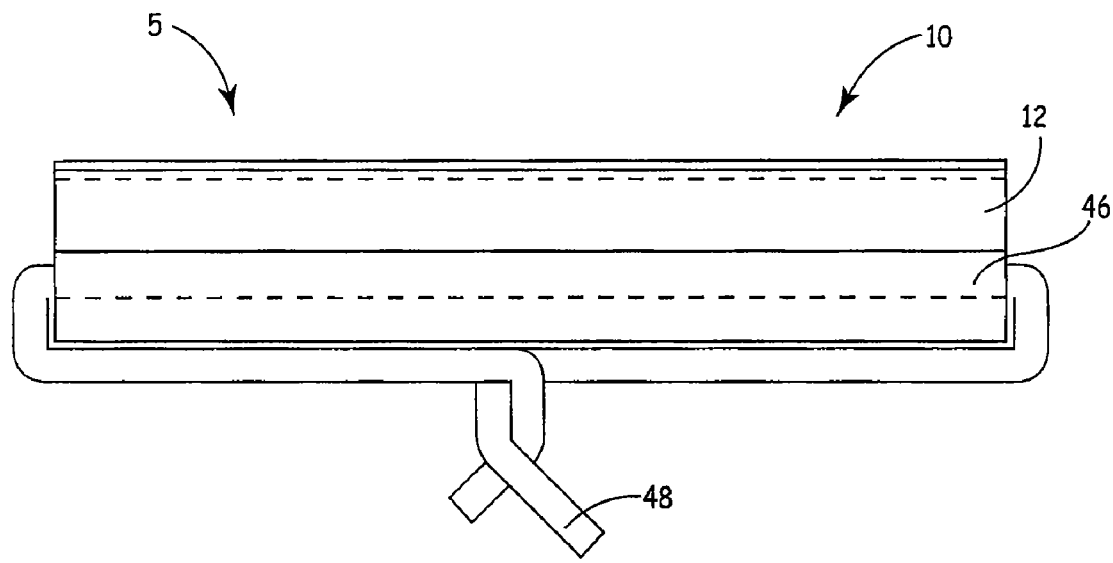
FIG. 12 is a side planar view of a magnetic recording head.

Referring to FIGS. 10 and 12, it can be seen that the width of the head 5 (or substrate 10) is substantially larger than a single patterned gap 30. This allows the recording head to bear a plurality of patterned gaps 30. For example, FIG. 10 illustrates a substrate 10 having five recording gaps 30 which could then write five servo tracks simultaneously. More or less can be utilized as desired and the final size of the head 5 can be adjusted to whatever parameters are required.

Rather than cutting the substrate 10 as shown in FIG. 11 and applying a coil as shown in FIG. 13, the substrate 10 could remain whole and the coils could be added to the C-shaped ferrite blocks 12, as they are shown in FIG. 1.

Figure 15:
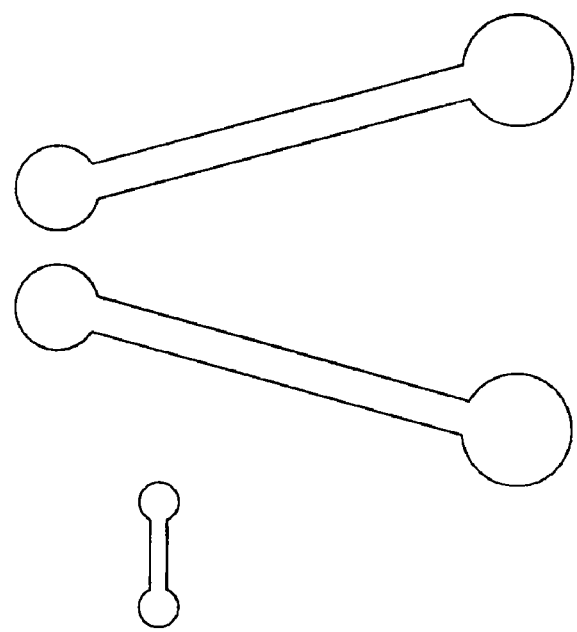
FIG. 15 shows an exemplary configuration of a terminating pattern with circular endpoints of an amplitude-based servo head.

The above head fabrication process has been described with respect to a magnetic recording head employing a timing-based servo pattern. However, the process could be applied equally well to any type of surface thin film recording head. For example, the head fabrication process can be applied to an amplitude-based servo head. An exemplary configuration of a terminating pattern with circular endpoints of an amplitude-based servo head is shown in FIG. 15. That is, those of ordinary skill in the art will appreciate that the FIB milling of the gaps could accommodate any shape or pattern, including the traditional single gap used in half-track servo tracks.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

Although the present invention has been described with reference to preferred embodiments, persons skilled in the art will recognize that changes may be made in form and detail without departing from the spirit and scope of the invention.

I claim:

1. A magnetic recording head for generating servo tracks on a magnetic medium, the magnetic recording head comprising:
   a substrate having a generally planar first surface;
   a magnetically-permeable thin film disposed on the first surface; and
   a gap pattern defined by the thin film, the gap pattern having at least one termination pattern, the termination pattern being at least one of substantially elliptical or substantially diamond-shaped.

2. The device of claim 1, wherein the gap has nearly parallel side walls.

3. The device of claim 1, wherein the termination pattern is substantially elliptical and has a length that is non-orthogonal to a width of the gap pattern.

4. The device of claim 1, wherein the termination pattern is substantially elliptical and has a length substantially orthogonal to the width of the gap pattern.

5. The device of claim 1, wherein the gap pattern is formed by removing a portion of the thin film using a focused ion beam oriented in a plane perpendicular to the plane of the first surface.

6. The device of claim 1, wherein the gap pattern is a timing-based servo pattern.

7. The device of claim 1, wherein the gap pattern is an amplitude-based servo pattern.

8. A gap pattern for a magnetic recording head, the gap pattern comprising a pair of non-parallel, longitudinally extending gaps having a width and terminating in at least one termination pattern, wherein the shape of the termination pattern comprises at least one of an ellipse and a diamond.

9. The gap pattern of claim 8, wherein the shape of the termination pattern is an ellipse having a length that is non-orthogonal to the width of the gaps.

10. The gap pattern of claim 8, wherein the shape of the termination pattern is an ellipse having a length substantially perpendicular to the width of the gaps.

11. The gap pattern of claim 8, wherein the shape of the termination pattern is a diamond, wherein the outside corners of the diamond are rounded.

12. The gap pattern of claim 11, wherein the rounded corners correspond to a circle having a diameter of from about 10% to about 50% of the length of a side of the termination pattern.

13. The gap pattern of claim 12, wherein the rounded corners correspond to a circle having a diameter of about 30% of the length of a side of the termination pattern.

14. The gap pattern of claim 8, wherein the gap pattern is a timing-based servo pattern.

15. The gap pattern of claim 8, wherein the gap pattern is an amplitude-based servo pattern.

16. Magnetic media imprinted with a servo pattern comprising a plurality of gap patterns which comprise a pair of non-parallel, longitudinally extending gaps having a width, and terminating at least one gap pattern with at least one termination pattern, wherein a width of the termination pattern is greater than the width of the longitudinally extending gap of the at least one gap pattern terminated with the at least one termination pattern.

17. The magnetic media of claim 16, wherein the termination pattern is generally elliptical.

18. The magnetic media of claim 16, wherein the termination pattern is generally diamond-shaped.

19. The magnetic media of claim 16, wherein the servo pattern is a timing-based servo pattern.

* * * * *